Nov. 16, 1937.    C. BRAMMING    2,098,997
STUD
Filed Oct. 28, 1935
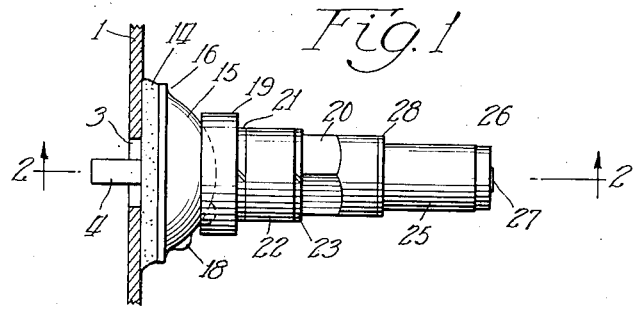
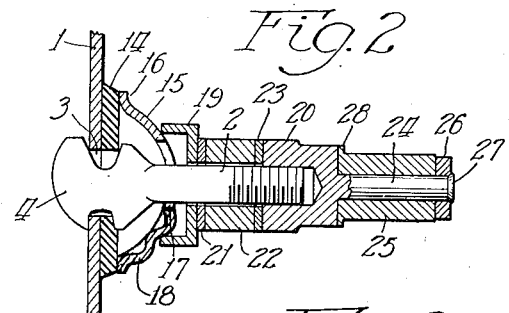
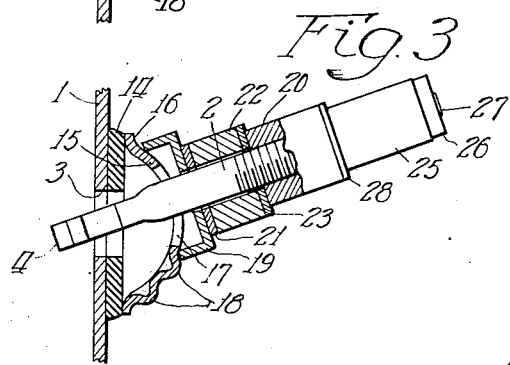
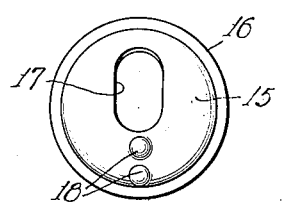
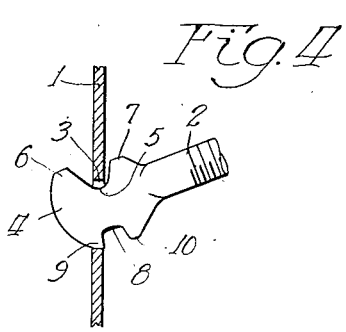
Witness:
V. Siljander
Inventor:
Carl Bramming.
By: Hill & Hill Attys.

Patented Nov. 16, 1937

2,098,997

UNITED STATES PATENT OFFICE 2,098,997

STUD

Carl Bramming, Gary, Ind., assignor to The Anderson Company, Gary, Ind., a corporation of Indiana Application October 28, 1935, Serial No. 47,117

6 Claims. (Cl. 248—239)

My invention belongs to that general class of devices known as studs or the like and relates more particularly to a stud designed for securement to a support to provide a bearing for a windshield wiper arm, but it is not restricted to this particular use.

The invention has among its objects the production of a device of the kind described that is simple, convenient, inexpensive, easy to install, compact, attractive, and which, when installed is extremely rigid and firmly secured.

The invention has particularly as an object the production of a stud of the kind described adapted to serve as a bearing and to be installed on an automobile at the outside of the same adjacent the windshield through a small drilled hole without the necessity of removing the header board or any interior part of the car, and without requiring the cutting of an irregular or specially shaped aperture.

The invention has as a further object the production of a stud of the kind described in which a shank is provided with a head so constructed that a portion of the same may be readily inserted in an aperture in a supporting part while holding the shank at an angle to the support, and thence the remaining portion of the head inserted when the shank is moved laterally whereby the head may thereafter be drawn into engagement with the support and be locked in place. In the embodiment of the invention shown, the shank is provided with integrally formed extensions at one end constituting a head of greater width and less thickness than the size of the aperture, one extension being slightly longer than the other with the distance between the end of the shorter extension and the opposite side of the shank less than the diameter of the aperture.

The invention has as a further object the production of a stud and securing means therefor which may be installed and stand substantially perpendicularly relative the support or at a desired angle to the same as is necessary in some installations, and which stud may be varied in overall length as required.

Among its further objects is the production of a device of the kind described provided with means for securing the stud in place at the desired angle so that the same will not shift its position, said securing means also serving as a closure so as to seal the aperture from which the stud projects.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is a plan view of the device installed on a suitable support;

Fig. 2 is a sectional view taken substantially on line 2—2 of Fig. 1;

Fig. 3 is a view similar to Fig. 2 showing the device in a tilted position;

Fig. 4 is a side elevation of a portion of the stud illustrating the method of installing the same; and Fig. 5 is a view in elevation of the cup-shaped washer 18.

In the drawing, I have illustrated a stud and associated parts particularly designed to form a bearing for a windshield wiper arm, the same being mounted on a suitable plate 1 generally of metal, which is provided with an aperture 3 through the same for receiving the head of a threaded shank 2. The head of the shank is generally designated by the numeral 4 which is of a width in its largest dimension greater than the diameter of the aperture 3, but of a thickness less than the aperture diameter. As shown, the head is provided with a notch 5 at one edge so that there are provided two lateral extensions 6 and 7 and with a notch 8 providing the lateral extensions 9 and 10, the extreme outer end of the head being preferably rounded. One extension at the end, as shown at 9, is somewhat shorter than the extension at the other side, the part being so designed that while the distance between the extreme ends of the extensions is larger than the diameter of the hole, the distance from the end of the extension 9 to the bottom of the notch 5 is less than the diameter of the aperture 3. In installing the device, the hole 3 is drilled in the plate at the desired point, it being obvious that a round drilled hole may be easily formed. Holding the shank 2 at an angle to the plate 1, the head 4 of the shank 2 is inserted through the opening substantially as shown in Fig. 4, after which the shank is moved laterally or straightened up so that the head extensions 6 and 9 engage the inner side of the plate at each side of the aperture substantially as shown in Fig. 2. The extensions 7 and 10 engaging at the outer side of the support prevent the stud from being accidentally pushed in too far and possibly dropping down behind the support and out of reach.

After the shank has been positioned, a washer 14 of suitable material, preferably rubber or the like, is positioned as shown and then a cup-shaped washer 15 is arranged on the shank. The cup-shaped washer 15 shown is convex or semi-spherical and is provided with an opening 17 to receive the shank part 2 and with a flange 16 adapted to seat on the washer 14. As most clearly illustrated in Fig. 5, the opening 17 in the washer 15 is preferably elongated where the stud is desired to be installed in any one of a plurality of adjustments as later described, and extends from the center of the washer to one side. Adjacent the opening one or more protuberances or stops 18 are provided, the purpose of the same being more fully explained hereinafter. A cup-shaped washer 19 is also mounted on the shank 2 and this is arranged to engage the convex face of the washer 15. At the outer end of the threaded shank is a nut 20 arranged to threadedly engage the shank. I have shown in Fig. 2 lock washers 21 and 23 arranged between 20 and 19 and a suitable spacer 22 which may be employed when desired.

The nut 20 in a wiper arm support is provided with a spindle or shaft 24 forming a bearing upon which I prefer to mount a sleeve 25 of suitable material so that it is substantially self-lubricating. This may be retained in place by the washer 26 secured on the spindle 24 by upsetting the end thereof as shown at 27. If desired, the inner end of the sleeve 25 may be flanged as at 28 so as to locate the securing of the wiper arm on the sleeve where it will not bind on the end of the nut.

As shown in Fig. 2, the stud stands out substantially perpendicularly to the face of the plate and it will be noted that in this figure the washer 15 is turned so that the protuberances 18 are below the shank with the flange of the cup-shaped washer 19 resting on one of the protuberances. This positively supports the stud and resists the sagging of the outer end, affording a more rigid construction. As shown in Fig. 3, the assembly is arranged so that the stud projects from the plate at an angle and the washer 16 in this instance is turned around so as to locate the slot 17 so that it will permit the tilting of the stud. In this instance the protuberance 18 is shown below the stud and engages with the flange on the washer 19, tending to likewise brace the same and prevent its dropping. There may be any desired number of protuberances arranged as found desirable. The stud may be supported at any desired angle. It is obvious that regardless of the angle or tilt of the supporting plate or the windshield, the device may be installed and adjusted to fit the car construction upon which it is installed.

It will be particularly noted by reference to Fig. 2 that the plate is engaged at each side of the aperture by the head extensions 6 and 9. As the nut 20 is tightened down, the friction of the washers on the front side of the support tends to prevent the shank and head from turning, this being particularly true where the rubber or like washer 14 is employed and the inner extensions 7 and 10 engage the rubber. Of course, as soon as the nut 20 exerts slight strain, drawing the stud shank outwardly, the head engaging the opposite side of the plate also tends to resist turning of the shank.

The device illustrated is primarily designed for use on automobiles where a twin wiper assembly is desired, one wiper arm being secured to the wiper motor drive shaft. In a twin assembly an additional arm is mounted on the car adjacent the windshield and this is actuated from the motor driven arm by means of a cross link. Many installations consist of a single wiper arm and motor as factory construction so that in providing an additional arm it is necessary to arrange for a support therefor. With the present construction, the additional arm may be readily mounted on the car by drilling the small hole or aperture 3 in the plate 1 adjacent the windshield and then installing the stud in the manner described, it being necessary only to drill the hole, insert the stud and turn down the nut 20 on the assembly. It is unnecessary to remove the header board at the interior of the car, and, in fact, it is even unnecessary to enter the car. Depending upon the make of car upon which the device is to be installed and the thickness of the support 1 and the distance from the support at which the arm is to be mounted, if required, the spacer 22 may be provided so as to permit an easy adjustment to vary the length of the stud. The spacer may be of the desired thickness and in some cases may be omitted entirely. One or more lock washers 21 and 23 may also be employed to prevent the parts from working loose in case of vibration. It will be noted that not only is the aperture 3 comparatively small, but that it is practically sealed against the admission of moisture, so that rain and moisture cannot get to the interior of the car through the aperture.

While I have particularly described the application of the stud as a support for a windshield wiper arm, it is obvious that the same may be used wherever found desirable for securing parts together where it is inconvenient to get to the back of one of the parts to use an ordinary bolt or nut. The device is inexpensive to manufacture and may be made in small sizes as well as larger units.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a supporting stud, the combination of a shank portion having a head adjacent one end thereof constructed to be insertable through a substantially circular aperture formed in a plate and engageable with the opposite side of said plate adjacent said aperture and at opposite sides thereof, said shank portion being adjustable angularly with respect to said plate, a spherically-shaped washer surrounding said shank portion at the opposite side of said plate from said head, and means operatively related to said shank portion and washer for securing the stud in fixed relation at various angles of adjustment with respect to said plate.

2. In a supporting stud, the combination of a shank portion having a T-shaped head adjacent one end thereof constructed to be insertable through a substantially circular aperture formed in a supporting plate and engageable with said plate adjacent said aperture and at opposite sides thereof, said shank portion being angularly movable with respect to said plate, a spherically-shaped washer having an elongated aperture formed therein adapted to receive said shank portion at the opposite side of said plate from said head, a cup-like member engageable with said washer, and means operatively related to said shank portion and cup-like member for securing the stud in fixed relation and at various angles with respect to said plate.

3. In a supporting stud, the combination with a plate of a stud having a shank portion having an integrally formed flattened head adjacent one end thereof constructed to be insertable through an aperture formed in a plate and engageable with the back face of said plate adjacent said aperture, a washer having a convex surface and having an elongated aperture formed therein adapted to receive said shank portion at the opposite side of said plate from said head, a protuberance on said convex surface, a washer of yieldable material interposed between said first mentioned washer and the plate, a cup-like member surrounding said shank portion and engageable with said washer and with said protuberance to secure the cup-like member against lateral movement with respect to said washer, and means operatively related to said shank portion and cup-like member for securing the stud in fixed relation with respect to said plate and washer.

4. A stud constructed for securement to an apertured supporting plate consisting of a shank provided with a T-shaped head insertable through the aperture in the plate when the shank is tilted relative the plate, the total width of the head being greater than the diameter of the aperture, a gasket washer mounted on the shank adjacent the head for engagement with the opposite side of the plate, a cup-shaped washer arranged on the shank provided with a slotted opening therein, a cup-shaped member arranged to seat upon the cup-shaped washer, a nut engageable with the thread of the shank and said member, said nut provided with a spindle at the outer end and a sleeve rotatably secured on said spindle.

5. A stud constructed for securement to an apertured supporting plate consisting of a shank provided with a head insertable through the aperture in the plate when the shank is tilted relative the plate, the width of the outer end of the head being greater than the diameter of the aperture, a yieldable gasket mounted on the shank adjacent the head for engagement with the opposite side of the plate, a cup-shaped washer arranged on the shank and provided with an elongated opening therein, a cup-shaped member arranged to seat upon the cup-shaped washer, a nut engageable with the thread of the shank and said member, said nut provided with a spindle at the outer end and a sleeve secured on said spindle.

6. A stud of the kind described consisting of the combination of a threaded shank terminating in a flattened head portion having a notch at each side of the shank to provide a plurality of lateral extensions at each side, a washer of gasket material arranged in the shank, a convex washer provided with an elongated opening and mounted in the shank adjacent said first washer, said convex washer having a protuberance in the body thereof, a cup-shaped member mounted on the spindle and seated in the convex face of the washer in engagement with said protuberance, and a nut threaded in said shank, said nut having a spindle at the outer end thereof.

CARL BRAMMING.